(12) United States Patent
Morris et al.

(10) Patent No.: US 8,435,711 B2
(45) Date of Patent: May 7, 2013

(54) TONERS MADE FROM LATEXES

(75) Inventors: Daniel Patrick Morris, Manchester (GB); John Dylan Morgan, Manchester (GB); Martin Russell Edwards, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 393 days.

(21) Appl. No.: 12/739,502

(22) PCT Filed: Oct. 21, 2008

(86) PCT No.: PCT/GB2008/003572
§ 371 (c)(1),
(2), (4) Date: Apr. 23, 2010

(87) PCT Pub. No.: WO2009/053688
PCT Pub. Date: Apr. 30, 2009

(65) Prior Publication Data
US 2012/0141934 A1    Jun. 7, 2012

(30) Foreign Application Priority Data
Oct. 26, 2007   (GB) .................................. 0721065.1

(51) Int. Cl.
*G03G 9/08*    (2006.01)
(52) U.S. Cl.
USPC .................. 430/109.3; 430/109.1; 430/111.4
(58) Field of Classification Search ............... 430/109.3, 430/109.1, 111.4
See application file for complete search history.

(56) References Cited

U.S. PATENT DOCUMENTS

| | | |
|---|---|---|
| 5,344,738 A | 9/1994 | Kmiecik-Lawrynowicz et al. ............... 430/137 |
| 5,364,729 A | 11/1994 | Kmiecik-Lawrynowicz et al. ............... 430/137 |
| 5,366,841 A | 11/1994 | Patel et al. .................... 430/137 |
| 5,370,963 A | 12/1994 | Patel et al. .................... 430/137 |
| 5,370,964 A | 12/1994 | Patel et al. .................... 430/137 |
| 5,391,456 A | 2/1995 | Patel et al. .................... 430/137 |
| 5,403,693 A | 4/1995 | Patel et al. .................... 430/137 |
| 5,405,728 A | 4/1995 | Hopper et al. ................ 430/137 |
| 5,837,415 A | 11/1998 | Uchida ........................ 430/109 |
| 5,910,389 A | 6/1999 | Matsumura et al. .......... 430/111 |
| 6,096,465 A | 8/2000 | Kadokura et al. ............ 430/106 |
| 6,214,510 B1 | 4/2001 | Kojima et al. ................ 430/110 |
| 6,294,606 B1 | 9/2001 | Chen et al. .................... 524/501 |
| 6,828,073 B2 | 12/2004 | Matsumura et al. ........ 430/108.1 |
| 6,838,220 B2 | 1/2005 | Matsumura et al. ........ 430/110.3 |
| 6,846,603 B2 | 1/2005 | Fujii et al. ................... 430/108.4 |
| 7,001,701 B2 | 2/2006 | Fujii et al. ................... 430/108.4 |
| 7,018,764 B2 | 3/2006 | Matsumura et al. ........ 430/110.2 |
| 2003/0149148 A1 | 8/2003 | Hammond et al. |
| 2005/0271962 A1* | 12/2005 | Suwa ........................ 430/109.3 |

FOREIGN PATENT DOCUMENTS

| | | |
|---|---|---|
| EP | 0 481 280 A2 | 4/1992 |
| EP | 1 788 452 A1 | 5/2007 |
| EP | 1 808 733 A1 | 7/2007 |
| JP | 2001-356525 | 12/2001 |
| JP | 2007-086458 | 4/2007 |
| WO | WO 96/35148 | 11/1996 |
| WO | WO 98/50828 | 11/1998 |

OTHER PUBLICATIONS

International Search Report issued in PCT Application No. PCT/GB2008/003572.

* cited by examiner

*Primary Examiner* — Mark A Chapman
(74) *Attorney, Agent, or Firm* — Morgan, Lewis & Bockius LLP

(57) ABSTRACT

A toner comprising toner particles which comprise binder resin and colorant, wherein the binder resin is made from latexes which comprise a low molecular weight (LMW) latex of resin particles having a weight average molecular weight (Mw) less than 50,000 and a medium molecular weight (MMW) latex of resin particles having a Mw from 50,000 to 500,000, wherein the glass transition temperature (Tg) of the resin particles of the LMW latex is not greater than 52° C.

15 Claims, No Drawings

TONERS MADE FROM LATEXES

This application is a 371 filing based on PCT/GB2008/003572 filed Oct. 21, 2008 and claiming priority from Great Britain Application No. 0721065.1, filed Oct. 26, 2007, all of which are hereby incorporated by reference in their entirety.

FIELD OF THE INVENTION

The invention relates generally to toners for electrophotographic use, especially toners made by wet chemical processes, to processes for preparing said toners, to latexes for use in such processes and uses of said toners in electrophotography.

BACKGROUND OF THE INVENTION

Electrophotography encompasses image forming technologies such as, for example, photocopying and laser printing. In these technologies a latent, electrostatic image is produced by forming an electrostatic charge on the surface of a photoconductive component (e.g. a drum) and partially or fully discharging the electrostatic charge on parts of the surface of the photoconductive component by exposing those parts to light. The exposure may be from light reflected from an illuminated image (photocopying) or from a laser which scans the photoconductive component, usually under instruction from a computer (laser printing). Once a latent image has been produced in charge it is developed, using a toner, to form a visible toner image on the photoconductive component which can then be transferred onto a suitable substrate (e.g. paper) so that a hard copy of the image is obtained after fixing the toner to the substrate. During use, friction between particles of toner, with their carrier and/or with parts of the electrophotographic apparatus cause the toner particles to become charged with an electrostatic charge (tribocharge) which enables them to develop the latent, electrostatic image. The toner may be employed without a magnetic carrier as so-called "one-component" (or "mono-component") developer or the toner may be employed with a magnetic carrier as so-called "two component" (or "dual-component") developer.

Toner comprises toner particles typically of average particle size 1-50 μm but more usually 2-15 μm. The toner particles typically comprise a binder resin, a colorant and optionally other ingredients such as, for example, wax, lubricant and/or charge control agent to improve the properties of the toner. The resin acts to fix the toner to the substrate, usually by fusion of the resin onto the substrate by heating. The colorant, which is usually a pigment, imparts the required colour to the toner. Toners typically also comprise one or more surface additives mixed with the toner particles to modify properties including flowability and chargeability.

Desirable characteristics of toners include being capable of forming an image with high resolution and high image density, without significant print defects such as, for example, fogging, ghosting and/or spotting. Moreover, there are many other demanding performance requirements of a toner. For instance, a toner desirably possesses as many of the following characteristics as possible: fixability to a substrate at low temperatures (e.g. by means of heated fusion rollers); releasability from fusion rollers over a wide range of fusion temperatures and/or speeds and/or over a wide range of toner print densities; good storage stability; good print transparency; good toner charging characteristics but without leading to background development of the photoconductor; avoidance of filming of a metering blade and/or development roller (for a mono-component device) or the carrier bead (for a dual-component device), or of the photoconductor; high transfer efficiency from the photoconductor to the substrate or intermediate transfer belt or roller and from the transfer belt or roller (where used) to the substrate; efficient cleaning of any residual toner remaining after image transfer where a mechanical cleaning device is used.

More recently, particular focus has been on achieving higher printing speeds (e.g. 30 pages per minute (ppm) and faster) which in turn demand higher fusion speeds of the toner to the substrate. Accordingly, there is especially a need for toners which are capable of good fixation at higher fusion speeds whilst still having many of the above desirable characteristics, for example resistance to filming and good storage stability.

Toners can be conventionally produced by melt kneading of a pigment, resin and other toner ingredients, followed by milling or pulverisation to produce toner sized particles. Classification is then needed to generate an acceptably narrow particle size distribution of the toner particles.

More recently, attention has been focussed on wet chemical routes to toners, where a suitable particle size is attained directly and not by a milling process, which thereby may avoid the need for a classification step. By avoiding the classification step, less material is wasted and higher yields of toner can be attained, especially as the target particle size is reduced. Lower particle size toners are of considerable interest for a number of reasons, including better print resolution, lower pile height, greater yield from a toner cartridge, faster or lower temperature fusing, and lower paper curl.

Several wet chemical routes to toners have been exemplified in the prior art. These include suspension polymerisation, solution-dispersion processes and so-called aggregation processes. Aggregation processes may provide good control over toner size and shape amongst other features and allow for efficient incorporation of different components in the toner. Several different types of aggregation processes are known, for example, as described in U.S. Pat. No. 4,996,127, U.S. Pat. No. 5,418,108, U.S. Pat. No. 5,066,560, U.S. Pat. No. 4,983,488 and PCT patent application WO 98/50828. In aggregation processes, typically, dispersed resin particles (and preferably colorant particles and optionally particles of other ingredients such as a release agent) in a liquid medium are associated to form larger, aggregate particles, which are useful as toner particles, optionally after further treatment such as heat treatment to fuse and/or shape the aggregate particles. Further such processes are described in U.S. Pat. No. 5,344,738, U.S. Pat. No. 5,364,729, U.S. Pat. No. 5,366,841, U.S. Pat. No. 5,370,963, U.S. Pat. No. 5,370,964, U.S. Pat. No. 5,391,456, U.S. Pat. No. 5,403,693, U.S. Pat. No. 5,405,728, U.S. Pat. No. 5,910,389, U.S. Pat. No. 6,096,465, U.S. Pat. No. 6,214,510, U.S. Pat. No. 6,251,556, U.S. Pat. No. 6,828,073, U.S. Pat. No. 6,838,220, U.S. Pat. No. 6,846,603, U.S. Pat. No. 7,001,701 and U.S. Pat. No. 7,018,764.

However, it remains desirable to provide further toners and processes for making toners in which one or more of the above mentioned properties are improved.

SUMMARY OF THE INVENTION

In different aspects, the present invention provides the following.
1) A toner comprising toner particles which comprise binder resin and colorant, wherein the binder resin is made from latexes comprising a low molecular weight (LMW) latex of resin particles having a weight average molecular weight (Mw) less than 50,000 and a medium molecular weight (MMW) latex of resin particles having a Mw from 50,000 to 500,000, wherein the glass transition temperature (Tg) of the resin particles of the LMW latex is not greater than 52° C.

2) A process for preparing a toner comprising toner particles which comprise binder resin and colorant, the process comprising at least the steps of: (i) providing latexes comprising a low molecular weight (LMW) latex of resin particles having a weight average molecular weight (Mw) less than 50,000 and a medium molecular weight (MMW) latex of resin particles having a Mw from 50,000 to 500,000, wherein the glass transition temperature (Tg) of the resin particles of the LMW latex is not greater than 52° C.; (ii) providing a dispersion of colorant particles; (iii) mixing the latexes with the dispersion of colorant particles; (iv) causing the resin particles and the colorant particles to associate to form aggregate particles; and (v) heating the aggregate particles above the Tg of the binder resin to form toner particles.

3) A toner obtainable by the process of 2) above.

4) A low molecular weight (LMW) latex of resin particles having a weight average molecular weight (Mw) less than 50,000 for use in preparing a toner, wherein the glass transition temperature (Tg) of the resin particles of the LMW latex is not greater than 52° C. and the LMW latex has been made by the polymerisation of a monomer mixture comprising 45-80 wt parts of at least one styrenic monomer 15-45 wt parts of at least one low Tg (meth) acrylate, 1-7 wt parts of at least one high Tg (meth)acrylate and 1-5 wt parts of at least one polar functional vinyl monomer, wherein the total number of parts is 100.

5) A toner comprising toner particles which comprise binder resin and colorant, wherein the binder resin is made from at least a LMW latex according to 4) above.

6) A medium molecular weight (MMW) latex of resin particles having a weight average molecular weight (Mw) from 50,000 to 200,000 for use in preparing a toner, wherein the glass transition temperature (Tg) of the resin particles of the MMW latex is 55-70° C. and the MMW latex has been made by the polymerisation of a monomer mixture comprising 45-88 wt parts of at least one styrenic monomer, 10-50 wt parts of at least one alkyl(meth)acrylate and 1-10 wt parts of at least one polar functional vinyl monomer, wherein the total number of parts is 100.

7) A toner comprising toner particles which comprise binder resin and colorant, wherein the binder resin is made from at least a MMW latex according to 6) above.

8) An image forming method comprising the steps of: forming an electrostatic image on a photoconductive member; developing the electrostatic image with a toner to form a toner image; transferring the toner image onto a substrate; and fixing the toner image onto the substrate; wherein the toner is a toner according to 1), 3), 5) or 7) above.

9) A toner cartridge having at least one chamber for containing a toner, wherein the chamber contains a toner, which is a toner according to 1), 3), 5) or 7) above.

Especially preferable are embodiments wherein the Tg of the resin particles of the MMW latex is higher than the Tg of the resin particles of the low molecular weight (LMW) latex.

Preferably, the LMW latex used to make the binder resin of the toner according to 1) above and used in the process according to 2) above is a LMW latex according to 4) above.

Preferably, the MMW latex used to make the binder resin of the toner according to 1) above and used in the process according to 2) above is a MMW latex according to 6) above.

Preferably, the toner according to 1) above is made by a wet chemical process and more preferably by a process according to 2) above.

It has been found that the toners according to the present invention may be useful in systems with higher printing speeds which require higher fusion speeds. In particular, toners according to the present invention may exhibit good fixation at higher fusion speeds whilst maintaining one or more other desirable properties of a toner.

Further details of the present invention are described below.

DETAILED DESCRIPTION OF THE INVENTION

Preferably, the toner particles comprise 100 weight parts of binder resin and 1-25 weight parts of colorant.

The binder resin may additionally be made from a high molecular weight (HMW) latex of resin particles having a Mw greater than 500,000.

Herein, the binder resin is constituted by the resin of all latexes combined (LMW, MMW and optional HMW).

The low molecular weight (LMW) latex may comprise a single LMW latex or two or more LMW latexes. That is, the binder resin may be made from one, two or more LMW latexes. Thus, herein, the term "a low molecular weight (LMW) latex" means a single LMW latex or two or more LMW latexes". Similarly, the medium molecular weight (MMW) latex may comprise a single MMW latex or two or more MMW latexes. That is, the binder resin may be made from one, two or more MMW latexes. Thus, the term "a medium molecular weight (MMW) latex" means a single MMW latex or two or more MMW latexes". Also similarly, where present, the high molecular weight (HMW) latex may comprise a single HMW latex or two or more HMW latexes. That is, the binder resin may be made from one, two or more HMW latexes. Thus, the term "a high molecular weight (HMW) latex" means a single HMW latex or two or more HMW latexes". However, in certain preferred embodiments, the binder resin is made from one LMW latex of resin particles of Tg not greater than 52° C., one MMW latex of resin particles and optionally a HMW latex.

Preferably, at least 45% by weight (more preferably at least 50% by weight) of the binder resin is made from the LMW latex of resin particles of Tg not greater than 52° C.

The binder resin of the toner is preferably made from, and the process preferably comprises providing, the latexes in the following relative amounts based on the solids content of the latexes: 45-95 wt parts of the LMW latex, 5-55 wt parts of the MMW latex and 0-15 wt parts of the high molecular weight (HMW) latex, wherein the total number of parts is 100. As mentioned, the wt parts of the latexes relate to the solids content of the latexes (i.e. the weight of the latex when dried to remove the liquid component).

More preferably, the amount of the LMW latex is 50-95 wt parts, still more preferably, 60-95 wt parts. More preferably, the amount of the MMW latex is 5-50 wt parts, still more preferably, 5-45 wt parts. More preferably, the amount of the HMW latex is 0-15 wt parts. Thus, more preferable is a binder resin made from the latexes in the amounts of 50-95 (especially 60-95) wt parts of the LMW latex, 5-50 (especially 5-45) wt parts of the MMW latex and 0-15 wt parts of the high molecular weight (HMW) latex, wherein the total number of parts is 100.

A non-limiting list of examples of different latex blends for binder resins within the scope of the present invention are shown in the table below, where the amounts in each composition shown in a row are in wt parts.

| Blend Example | LMW | MMW | HMW |
| --- | --- | --- | --- |
| 1 | 95 | 5 | 0 |
| 2 | 90 | 10 | 0 |
| 3 | 90 | 5 | 5 |
| 4 | 85 | 15 | 0 |
| 5 | 85 | 10 | 5 |
| 6 | 80 | 20 | 0 |
| 7 | 80 | 15 | 5 |
| 8 | 80 | 10 | 10 |
| 9 | 75 | 25 | 0 |
| 10 | 75 | 20 | 5 |
| 11 | 75 | 15 | 10 |
| 12 | 70 | 30 | 0 |
| 13 | 70 | 25 | 5 |
| 14 | 70 | 20 | 10 |
| 15 | 65 | 35 | 0 |
| 16 | 65 | 25 | 10 |
| 17 | 60 | 40 | 0 |
| 18 | 60 | 30 | 10 |
| 19 | 55 | 35 | 10 |
| 20 | 50 | 35 | 15 |
| 21 | 50 | 40 | 10 |
| 22 | 45 | 40 | 15 |
| 23 | 45 | 55 | 0 |

The binder resin may comprise minor amounts of resin from a further LMW latex of resin particles which have a Tg greater than 52° C., provided that the binder resin is still made from the above LMW latex of resin particles having a Tg not greater than 52° C. In other words, the present invention does not exclude minor amounts of other latexes and/or resins.

The glass transition temperature (Tg) referred to herein is that measured of a dried latex by Differential Scanning calorimetry (DSC) as being the midpoint value from a re-heat DSC scan (i.e. after an initial heat and cool), in the method of measurement, a Differential Scanning calorimeter such as a TA Q1000 is used with the measurement procedure comprising heating from 0-150° C. at 15° C./minute, followed by cooling rapidly to 0° C. and then re-heating to 150° C. at 15° C./minute. The Tg is taken as the midpoint value from the re-heat scan.

Preferably, the Tg of the resin particles of the LMW latex is at least 45° C., more preferably at least 47° C. and most preferably at least 48° C.

Especially preferably the Tg of the resin particles of the MMW latex is higher than the Tg of the resin particles of the LMW latex. More especially preferably, the Tg of the resin particles of the MMW latex is at least 5° C. higher than the Tg of the resin particles of the LMW latex.

Preferably, the Tg of the resin particles of the MMW latex is at least 55° C., more preferably at least 57° C. Preferably, the Tg of the resin particles of the MMW latex is less than 70° C. and more preferably is less than 68° C. Accordingly, the Tg of the resin particles of the MMW latex is preferably in the range 55-70° C., more preferably 55-68° C. and most preferably 57-68° C.

In a particularly preferred embodiment, the Tg of the resin particles of the MMW latex is in the range 55-62° C.

Accordingly, in preferred embodiments, the Tg of the resin particles of the LMW latex is in the range 45-52° C. (more preferably 47-52° C.) and the Tg of the MMW resin or resin particles of the MMW latex is in the range 55-70° C. (more preferably 55-68° C. and especially 55-62° C.). Especially preferred therefore is the embodiment wherein the Tg of the resin particles of the LMW latex is in the range 47-52° C. and the Tg of the resin particles of the MMW latex is in the range 55-68° C. (more especially 55-62° C.). In such preferred embodiments, the Tg of the resin particles of the MMW latex is preferably at least 5° C. higher than the Tg of the resin particles of the LMW latex.

Where the HMW latex is present, the Tg of the resin particles of the HMW latex is at least 55° C., more preferably at least 57° C. Preferably, the Tg of the resin particles of the HMW latex is less than 70° C. and more preferably is less than 68° C. Accordingly, the Tg of the resin particles of the HMW latex is preferably in the range 55-70° C., more preferably 55-68° C. and most preferably 57-68° C. Preferably, the Tg of the resin particles of the HMW latex is at least 5° C. higher than the Tg of the resin particles of the LMW latex.

In this specification: the terms low molecular weight (LMW) resin or latex mean a resin or latex having resin particles of weight average molecular weight (Mw) less than 50,000; the terms medium molecular weight (MMW) resin or latex mean a resin or latex having resin particles of Mw from 50,000 to 500,000; and the terms high molecular weight (HMW) resin or latex mean a resin or latex having resin particles of Mw greater than 500,000.

Molecular weights specified herein (including Mw and Mn) are determined for the dried latex by Gel Permeation Chromatography (GPC) against polystyrene standards using an Agilent HP1100 instrument with THF as eluent and PL Mixed Gel C columns.

Preferably, the LMW resin or latex has a monomodal molecular weight distribution. By a monomodal molecular weight distribution is meant one for which the GPC spectrum shows only one peak. By comparison, a bimodal molecular weight distribution herein means one for which the GPC spectrum shows two peaks, or a peak and a shoulder.

Preferably, the LMW resin or resin particles of the LMW latex have a number average molecular weight (Mn) of from 3000 to 10000, more preferably from 4000 to 9000.

Preferably, the LMW resin or resin particles of the LMW latex have a weight average molecular weight (Mw) of at least about 5,000. More preferably, the LMW resin or resin particles of the LMW latex have a Mw of at least 10,000 and still more preferably, at least 15,000 and most preferably at least 20,000. Preferably, the LMW resin or resin particles of the LMW latex have a Mw of 35,000 or less and still more preferably 30,000 or less and especially 25,000 or less. Thus, the LMW resin or resin particles of the LMW latex preferably have a Mw of 5,000 to 35,000, especially 10,000 to 35,000, more especially 15,000 to 30,000 and most especially 15,000 to 25,000. In a particularly preferred embodiment the LMW resin or resin particles of the LMW latex have a Mw of 20,000 to 25,000.

Preferably, the ratio of Mw/Mn of the LMW resin or resin particles of the LMW latex is less than about 10.

Preferably, the MMW latex has either a monomodal or a bimodal molecular weight distribution, more preferably a monomodal molecular weight distribution.

The resin particles of the MMW latex preferably have a weight average molecular weight (Mw) of from 50,000 to 400,000, more preferably from 50,000 to 300,000, still more preferably from 50,000 to 200,000 and most preferably from 50,000 to 100,000.

Where present in the toner, the HMW resin or latex preferably has a bimodal molecular weight distribution. The resin particles of the HMW latex have a weight average molecular weight (Mw) which is greater than 500,000 and which may be 1,000,000 or more. For example, Mw may be up to 2,000,000. In other embodiments Mw may be more than 2,000,000.

The resins or latexes may be made by polymerisation processes known in the art, preferably by emulsion polymerisation as described in more detail below. However, the binder resin may also be made from resins not made by emulsion polymerisation (either in addition to or alternative to resins made by emulsion polymerisation). Examples include the following resins or latexes thereof, not used in emulsion polymerisation: polyesters, polyurethanes, hydrocarbon polymers, silicone polymers, polyamides, etc. and dispersions thereof in liquid (e.g. aqueous) media.

Preferably, the resin particles of the latexes are free from (i.e. do not contain) reactive groups, such as epoxy groups.

The molecular weight of the resin or resin particles in the latexes can be controlled by methods known in the art, for example, by use of a chain transfer agent (e.g. a mercaptan) and/or by control of initiator concentration in the case of emulsion polymerisation, and/or by heating time. Preferably, the LMW latex has a monomodal molecular weight distribution. Preferably, the MMW latex has either a monomodal or a bimodal molecular weight distribution, more preferably a monomodal molecular weight distribution. Latexes with a bimodal molecular weight distribution may be made using a two-stage polymerisation. Preferably a higher molecular weight resin is made first then, in a second stage, a lower molecular weight resin is made in the presence of the first resin. As a result, a bimodal molecular weight distribution resin is made containing both lower and higher molecular weight resins.

The resins of the LMW, MMW and/or HMW latex may also contain cross-linked material by inclusion of a multi-functional monomer (e.g. divinylbenzene or a multi-functional acrylate) in the monomer mixture used to make the latexes, However, preferably, the LMW, MMW and/or HMW latexes do not contain cross-linked material by inclusion of a multifunctional monomer. That is, the resin particles of the LMW latex are preferably non-crosslinked resin particles. Further preferably, the resin particles of the MMW and/or HMW latexes are non-crosslinked resin particles.

Preferred resins or latexes are made by emulsion polymerisation. The resins or latexes may be made from polymerisation of one or more of the following preferred monomers for emulsion polymerisation: styrenic monomers (styrene and substituted styrenes); alkyl acrylates and alkyl methacrylates (e.g. especially $C_{1-12}$alkyl acrylates and methacrylates, such as, for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, octyl acrylate, octyl methacrylate, dodecyl acrylate, dodecyl methacrylate etc.); polar functional vinyl (especially acrylic or methacrylic) monomers with, for example, hydroxy or carboxylic acid functionality, hydroxy functionality being preferred, preferred examples of monomers with hydroxy functionality including 2-hydroxyethyl acrylate, 2-hydroxyethyl methacrylate, hydroxy-terminated polyethylene oxide) acrylates or methacrylates, and hydroxy-terminated poly(propylene oxide) acrylates or methacrylates, examples of monomers with carboxylic acid functionality including acrylic acid and beta-carboxyethylacrylate; hydrocarbon vinyl-type monomers such as ethylene, propylene, butylene, isoprene and butadiene; vinyl esters such as vinyl acetate; other monomers such as acrylonitrile, maleic anhydride and vinyl ethers. The resins or latexes preferably are made from polymerisation of two or more of the above monomers (i.e. the resin particles in the latex comprise a co-polymer of two or more of the above monomers). The term co-polymer herein means a polymer made from two or more different types of monomers (e.g. three or four different types of monomers). The term hydroxy functional herein means having hydroxy groups but not acidic or basic groups (e.g. not carboxylic acid groups), as evident from the examples of hydroxy functional monomers above.

Preferably, the LMW and MMW (and optionally the HMW) resins or latexes each comprise copolymers made from the same monomers. However, preferably the LMW and MMW resins or latexes (and optionally the HMW) are made using different amounts of the same monomers.

Preferred resins or latexes (LMW, MMW and HMW) comprise copolymers of three or four different monomers. Preferred resins or latexes (LMW, MMW and HMW) comprise copolymers of: (i) a styrenic monomer (styrene or substituted styrene), (ii) at least one alkyl(meth)acrylate (especially $C_{1-12}$alkyl(meth)acrylate) and (iii) a polar-functional (especially carboxylic acid or hydroxy functional, more especially hydroxy functional) vinyl monomer. In the foregoing preferred resins or latexes, most preferably (i) is styrene, (ii) is at least one $C_{1-4}$alkyl(meth)acrylate and (iii) is a carboxylic acid functional or hydroxy functional vinyl monomer, Preferred examples of (iii) include acrylic acid, methacrylic acid, beta-carboxyethyl acrylate or a hydroxy functional alkyl(meth)acrylate (especially a hydroxy functional $C_{1-4}$alkyl(meth)acrylate, e.g. 2-hydroxyethyl methacrylate).

The at least one styrenic monomer to be used to make the LMW latex (and/or the MMW and/or the HMW latex) may comprise styrene (i.e. unsubstituted styrene) and/or a substituted styrene (e.g. an alkyl substituted styrene). Most preferably, the at least one styrenic monomer is styrene (i.e. unsubstituted).

In this specification the term (meth)acrylate refers to acrylate or methacrylate.

Preferred (meth)acrylate(s) herein are alkyl(meth)acrylates. Preferred alkyl(meth)acrylates herein are $C_{1-12}$alkyl(meth)acrylates, more preferably $C_{1-8}$alkyl(meth)acrylates, still more preferably $C_{1-6}$alkyl(meth)acrylates and most preferably $C_{1-4}$alkyl(meth)acrylates. Examples of $C_{1-4}$alkyl(meth)acrylates herein are butyl acrylate, propyl acrylate, ethyl acrylate, methyl acrylate, butyl methacrylate, propyl methacrylate, ethyl methacrylate and methyl methacrylate.

The low molecular weight (LMW) latex of resin particles most preferably has been made by the polymerisation of a monomer mixture comprising 45-80 wt parts of at least one styrenic monomer, 18-50 wt parts of at least one alkyl(meth)acrylate and 1-5 wt parts of at least one polar functional vinyl monomer, wherein the total number of parts is 100.

The 18-50 wt parts of at least one alkyl(meth)acrylate preferably is made up of 15-45 wt parts of at least one low Tg (meth)acrylate and 0-7 wt parts of at least one high Tg (meth)acrylate. Preferably the monomer mixture for the LMW resin or latex comprises at least one high Tg (meth)acrylate in an amount 1-7 wt parts.

More preferably, the monomer mixture for the LMW latex comprises 70-78 (especially 72-78) wt parts of the at least one styrenic monomer, 16-21 wt parts of the at feast one low Tg (meth)acrylate, 2-6 wt parts of the at least one high Tg (meth)acrylate and 1-4 wt parts of the at least one polar functional vinyl monomer.

In this specification the term low Tg (meth)acrylate means a (meth)acrylate having a Tg lower than the Tg of the resin particles of the latex which the (meth)acrylate is used to make and the term high Tg (meth)acrylate means a (meth)acrylate having a Tg the same as or higher than the Tg of the resin particles of the latex which the (meth)acrylate is used to make. The low Tg (meth)acrylate(s) and the high Tg (meth)acrylate(s) are preferably alkyl(meth)acrylates.

With regard to low Tg (meth)acrylate(s) in the resin in the LMW latex of resin particles, in a preferred embodiment, at least some, more preferably all of the low Tg (meth)acrylate (s) each have effective Tg's (as homopolymers) of less than 40° C., more preferably less than 25° C. and especially less than 0° C. Similarly, with regard to the high Tg (meth)acrylate (s) in the resin in the LMW latex of resin particles, in a preferred embodiment, at least some, more preferably all of the high Tg (meth)acrylate(s) each have effective Tg's (as homopolymers) of at least 55° C., more preferably at least 65° C. and especially at least 80° C.

With regard to the low Tg (meth)acrylate(s) in the resin of the MMW or HMW latex of resin particles in a preferred embodiment, at least some, more preferably all of the low Tg (meth)acrylate(s) each have effective Tg's (as homopolymers) of less than 55° C. more preferably less than 25° C. and especially less than 0° C. Similarly, with regard to the high Tg (meth)acrylate(s) in the resin of the MMW or HMW latex of resin particles, in preferred a embodiment, at least some, more preferably all of the high Tg (meth)acrylate(s) each have effective Tg's (as homopolymers) of at least 70° C., more preferably at least 75° C. and especially at least 80° C.

Preferred low Tg (meth)acrylate for the latexes (especially the LMW latexes) herein are $C_{1-12}$alkyl(meth)acrylates, more preferably $C_{3-12}$alkyl(meth)acrylates, still more preferably $C_{3-8}$alkyl(meth)acrylates and most preferably $C_{3-6}$alkyl(meth)acrylates.

Examples of a low Tg (meth)acrylate for the latexes (especially the LMW latexes) herein may include 2-ethylhexyl acrylate, butyl acrylate, butyl methacrylate, propyl acrylate, ethyl acrylate and methyl acrylate.

An example of a high Tg (meth)acrylate for the latexes herein is methyl methacrylate.

Preferably, the low Tg (meth)acrylate is selected from the group consisting of 2-ethylhexyl acrylate, butyl acrylate, butyl methacrylate, propyl acrylate and ethyl acrylate (especially butyl acrylate and butyl methacrylate). Especially, the high Tg (meth)acrylate is methyl methacrylate. Most especially, the low Tg (meth)acrylate is butyl acrylate and/or butyl methacrylate and the high Tg (meth)acrylate is methyl methacrylate.

The term polar functional vinyl monomer herein means a vinyl monomer (i.e. a monomer containing a vinyl group, such as a styrene, (meth)acrylic acid or a (meth)acrylate) which has one or more polar groups. The polar groups may be acidic polar groups, basic polar groups or polar groups which are not acidic or basic such as hydroxy groups. Preferred polar groups include carboxylic acid, sulphonic acid, amino and hydroxy groups. More preferred polar groups are carboxylic acid and hydroxy groups. A most preferred polar group is a hydroxy group. Accordingly, most preferably, the polar functional vinyl monomer is a hydroxy functional vinyl monomer. In embodiments where the polar functional vinyl monomer has one or more hydroxy groups (i.e. is a hydroxy functional vinyl monomer), preferably it does not contain acidic or basic groups.

The polar functional vinyl monomer is preferably a polar functional (meth)acrylate. In view of the above preferences for polar groups, the polar functional vinyl monomer is preferably a (meth)acrylate carrying one or more polar groups selected from carboxylic acid and hydroxy groups, especially hydroxy. Thus, most preferably, the polar functional vinyl monomer is a hydroxy functional (meth)acrylate.

Examples of polar functional vinyl monomers having carboxylic acid groups are acrylic acid, methacrylic acid and beta-carboxyethyl acrylate. Examples of polar functional vinyl monomers having hydroxy groups include the following (meth)acrylate monomers: 2-hydroxyethyl acrylate; 2-hydroxyethyl methacrylate; hydroxypropyl acrylates; and hydroxypropyl methacrylates; hydroxybutyl acrylates; hydroxybutyl methacrylates; poly(ethylene glycol) mono acrylates; poly(ethylene glycol) mono methacrylates; poly (propylene glycol) mono acrylates; and poly(propylene glycol) mono methacrylates. Especially preferred are 2-hydroxyethyl acrylate; 2-hydroxyethyl methacrylate.

In accordance with the above preferences, a particularly preferred monomer mixture for making the LMW latex comprises: 45-80 wt parts of styrenic monomer, 18-50 wt parts of at least one alkyl(meth)acrylate and 1-5 wt parts of at least one polar functional vinyl monomer, wherein the total number of parts is 100.

In accordance with the above preferences, a more particularly preferred monomer mixture for making the LMW latex comprises: 45-80 wt parts of styrenic monomer, 15-45 wt parts of at least one low Tg (meth)acrylate, 0-7 wt parts (especially 1-7 wt parts) of at least one high Tg (meth)acrylate and 1-5 wt parts of a polar functional vinyl monomer, wherein the total number of parts is 100.

More preferably, the monomer mixture for making the LMW latex comprises 70-78 (especially 72-78) wt parts of styrenic monomer, 16-21 wt parts of the at least one low Tg (meth)acrylate, 2-6 wt parts of the at least one high Tg (meth) acrylate and 1-4 wt parts of the polar functional vinyl monomer.

In the above preferred monomer mixtures for making the LMW latex, the at least one low Tg (meth)acrylate is preferably selected from the group consisting of 2-ethylhexyl acrylate, butyl acrylate, butyl methacrylate, propyl acrylate and ethyl acrylate (especially butyl acrylate and butyl methacrylate) and the at least one high Tg (meth)acrylate is preferably methyl methacrylate.

Accordingly, especially, the monomer mixture for making the LMW latex comprises 45-80 wt parts of styrenic monomer, 15-45 wt parts of at least one low Tg (meth)acrylate selected from the group consisting of 2-ethylhexyl acrylate, butyl acrylate, butyl methacrylate, propyl acrylate and ethyl acrylate (especially butyl acrylate and butyl methacrylate), 2-6 wt parts of methyl methacrylate and 1-5 wt parts of the polar functional vinyl monomer (preferably a hydroxy functional vinyl monomer, e.g. 2-hydroxyethyl methacrylate) wherein the total number of parts is 100.

Accordingly, most especially, the monomer mixture for making the LMW latex comprises 70-78 (especially 72-78) wt parts of styrenic monomer, 16-21 wt parts of butyl acrylate, 2-6 wt parts of methyl methacrylate and 1-4 wt parts of the polar functional vinyl monomer (preferably a hydroxy functional vinyl monomer, e.g. 2-hydroxyethyl methacrylate) wherein the total number of parts is 100. Examples of monomer mixtures for making the LMW latex of the present invention are shown in the table below (all amounts are in wt parts):

| Styrene | low Tg (meth)acrylate | high Tg (meth)acrylate | polar functional vinyl monomer |
|---|---|---|---|
| 50 ST | 43 BMA | 4 MMA | 3 HEMA |
| 70 ST | 21 BA | 5 MMA | 4 HEMA |
| 61 MST | 32 BA | 4 MMA | 3 CEA |
| 74 ST | 20 BA | 4 MMA | 2 AA |
| 74 ST | 19 BA | 4 MMA | 3 HEMA |
| 75 ST | 18 BA | 4 MMA | 3 HEMA |
| 75 ST | 18 BA | 4 MMA | 3 CEA |

-continued

| Styrene | low Tg (meth)acrylate | high Tg (meth)acrylate | polar functional vinyl monomer |
|---|---|---|---|
| 76 ST | 17 BA | 4 MMA | 3 HEMA |
| 59 MST | 35 BA | 3 MMA | 3 MAA |

ST = styrene
MST = alpha-methyl styrene
BA = butyl acrylate
BMA = butyl methacrylate
MMA = methyl methacrylate
HEMA = 2-hydroxyethyl methacrylate
AA = Acrylic acid
MAA = Methacrylic acid
CEA = beta-carboxyethyl acrylate It will be appreciated that the monomer mixtures in the above table are merely illustrative of the present invention. For instance, both the monomers and the amounts may be changed to provide further monomer mixtures suitable for use in the present invention. For example, butyl acrylate may be replaced with another monomer from the list of suitable low Tg (meth)acrylate monomers provided herein, e.g. 2-ethylhexyl acrylate or other monomers of like Tg. For example, butyl methacrylate may be replaced with another monomer from the list of suitable low Tg (meth)acrylate monomers provided herein, e.g. methyl acrylate or other monomers of like Tg.

Preferably, the MMW latex has either a monomodal or a bimodal molecular weight distribution, more preferably a monomodal molecular weight distribution.

Preferably, the MMW latex is of resin which comprises a copolymer made from the same monomers as the LMW latex described above. However, preferably the MMW latex is made using different relative amounts of the monomers.

A monomer mixture for making the MMW latex may comprise: 45-88 (especially 65-88) wt parts of styrenic monomer, 10-50 (especially 10-30) wt parts of at least one alkyl(meth)acrylate and 1-10 wt parts of at least one polar functional vinyl monomer, wherein the total number of parts is 100.

A more preferred monomer mixture for making the MMW latex may therefore comprise: 65-88 wt parts of styrenic monomer, 10-30 wt parts of at least one alkyl(meth)acrylate and 1-10 wt parts of at least one polar functional vinyl monomer, wherein the total number of parts is 100. A more preferred MMW latex is desirably monomodal in its molecular weight distribution.

An even more preferred MMW latex has been made by the polymerisation of a monomer mixture comprising 67-75 wt parts of at least one styrenic monomer, 21-29 wt parts of at least one alkyl(meth)acrylate and 2-6 wt parts of at least one polar functional vinyl monomer, wherein the total number of parts is 100. An even more preferred MMW latex is desirably monomodal in its molecular weight distribution.

More preferably, the MMW latex has been made by the polymerisation of a monomer mixture comprising: 45-85 (especially 65-88, more especially 67-75) wt parts of at least one styrenic monomer, 10-45 (especially 18-25) wt parts of at least one low Tg (meth)acrylate, 0-7 wt parts of at least one high Tg (meth)acrylate and 2-6 wt parts of at least one polar functional vinyl monomer, wherein the total number of parts is 100.

More preferably still, the MMW latex has been made by the polymerisation of a monomer mixture comprising: 45-85 (especially 65-88, more especially 67-75) wt parts of at least one styrenic monomer, 10-45 (especially 18-25) wt parts of at least one low Tg (meth)acrylate, 1-7 wt parts of at least one high Tg (meth)acrylate and 2-6 wt parts of at least one polar functional vinyl monomer, wherein the total number of parts is 100.

In the above preferred monomer mixtures for making the MMW latex, the at least one low Tg (meth)acrylate is preferably selected from the group consisting of 2-ethylhexyl acrylate, butyl acrylate, butyl methacrylate, propyl acrylate and ethyl acrylate (especially butyl acrylate and butyl methacrylate) and the at least one high Tg (meth)acrylate is preferably methyl methacrylate.

Accordingly, especially preferably, the monomer mixture for making the MMW latex comprises 45-85 (especially 65-88, more especially 67-75) wt parts of styrenic monomer, 10-45 (especially 18-25) wt parts of at least one low Tg (meth)acrylate selected from the group consisting of 2-ethylhexyl acrylate, butyl acrylate, butyl methacrylate, propyl acrylate and ethyl acrylate (especially butyl acrylate and butyl methacrylate), 1-7 wt parts of methyl methacrylate and 2-6 wt parts of the polar functional vinyl monomer (preferably a hydroxy functional vinyl monomer, e.g. 2-hydroxyethyl methacrylate) wherein the total number of parts is 100.

Accordingly, most especially preferably, the monomer mixture for making the MMW latex comprises 67-75 wt parts of styrenic monomer, 18-25 wt parts of butyl acrylate, 1-7 wt parts of methyl methacrylate and 2-6 wt parts of the polar functional vinyl monomer (preferably a hydroxy functional vinyl monomer, e.g. 2-hydroxyethyl methacrylate) wherein the total number of parts is 100.

Preferably, the HMW latex has either a monomodal or a bimodal molecular weight distribution, more preferably bimodal.

Preferably, the HMW latex is of resin which comprises a copolymer made from the same monomers as the LMW and MMW resin or latex described above. However, preferably the HMW resin or latex is made using different relative amounts of the monomers.

A monomer mixture for making the HMW latex may comprise: 45-88 (especially 65-88) wt parts of styrenic monomer, 10-50 (especially 10-30) wt parts of at least one alkyl(meth)acrylate and 1-10 (or in some embodiments 1-5) wt parts of at least one polar functional vinyl monomer, wherein the total number of parts is 100.

As mentioned above in all cases it is preferred that the styrenic monomer (styrene and substituted styrene monomers) present in the resins/latexes is styrene.

The toner may be prepared by mixing the resin particles and colorant (and optionally other ingredients as herein described), e.g. by methods known in the art of toner manufacture. The resins are in the form of latexes (i.e. dispersions of resin particles in a liquid) and the latexes are mixed with the colorant in a dispersion as herein described.

Preferably, each latex and each dispersion in the invention is a dispersion in water, e.g. each latex is a dispersion of resin particles in water.

The latexes preferably each comprise an ionic surfactant. This may be an ionic surfactant used in an emulsion polymerisation to form the latex. The ionic surfactant acts to stabilise the dispersed resin particles in the latex. It is preferred that the latexes comprise an ionic surfactant of the same polarity (anionic or cationic) as each other and as the ionic surfactant preferably present in the colorant dispersion (and optional wax dispersion as hereinafter described). This enables individual components to be well mixed prior to the step of association. It is even more preferred that the latexes comprise the same ionic surfactant as the ionic surfactant preferably present in the colorant dispersion (and optional wax dispersion). The latexes preferably comprise a reversibly ionisable ionic surfactant, i.e. which is capable of being converted from an ionic to a non-ionic form (and vice versa) by a change in pH. In the latter case, this enables the stabilising effect of the ionic surfactant to be reduced by changing the pH to convert the ionic surfactant to its non-ionic form thereby providing a convenient and effective means to cause association of the resin particles (and colorant and optionally wax particles). In such embodiments, the reversibly ionisable ionic surfactant contains a group which can be reversibly converted from an ionic to a non-ionic form by adjustment of pH. Preferred such groups include carboxylate or tertiary amine groups (especially a carboxylate group).

Optionally a non-ionic surfactant may also be present in the latex.

Suitable ionic surfactants include known anionic and cationic surfactants. Examples of suitable anionic surfactants are: alkyl benzene sulphonates (e.g. sodium dodecylbenzene sulphonate); alkyl sulphates; alkyl ether sulphates; sulphosuccinates; phosphate esters; fatty acid carboxylates, including alkyl carboxylates; and alkyl or aryl alkoxylated carboxylates, which include, for example, alkyl ethoxylated carboxylates, alkyl propoxylated carboxylates and alkyl ethoxylated/propoxylated carboxylates. Examples of suitable cationic surfactants are: quaternary ammonium salts; benzalkonium chloride; ethoxylated amines.

Examples of non-ionic surfactants are: alkyl ethoxylates; alkyl propoxylates; alkyl aryl ethoxylates; alkyl aryl propoxylates; and ethylene oxide/propylene oxide copolymers.

In a preferred embodiment, the ionic surfactant comprises an anionic surfactant, especially an anionic surfactant having a carboxylate group (i.e. a carboxy functional anionic surfactant). Anionic surfactants having a carboxylate group are examples of the preferred type of surfactant, namely the reversibly ionisable ionic surfactant described above. More preferred still are the fatty acid carboxylates (including alkyl carboxylates) and alkyl or aryl alkoxylated carboxylates. Examples of fatty acid carboxylates include salts of lauric acid, myristic acid, palmitic acid, stearic acid, oleic acid and the like. Most preferred still are the alkyl alkoxylated carboxylates, such as, e.g., alkyl ethoxylated carboxylates, alkyl propoxylated carboxylates and alkyl ethoxylated/propoxylated carboxylates, especially wherein the alkyl is $C_{8-14}$ alkyl. Suitable alkyl alkoxylated carboxylates are commercially available, such as in the Akypo™ range of surfactants from Kao Corporation and the Marlowet™ range of surfactants from Sasol.

The resin particles in the latexes are preferably sub-micron sized. The average size of the resin particles in the latexes, as measured using photon correlation spectroscopy, is preferably less than 200 nm and more preferably less than 150 nm. Preferably, the average size of the resin particles in the latexes is at least 20 nm, more preferably at least 50 nm. Thus, the resin particles may preferably be from 20-200 nm in size, more preferably from 50-150 nm. The average size of the primary resin particles may, for example, lie in the range 80-120 nm.

The latexes are preferably each formed by emulsion polymerisation.

Methods for performing emulsion polymerisation are not particularly limited. Methods for performing emulsion polymerisation are known in the art. In embodiments of the present invention, the monomer mixture may be added in one or more batches or fed continuously to a solution of ionic surfactant and an initiator in water. The polymerisation is then preferably carried out by heating. The polymerisation is preferably carried out in a nitrogen atmosphere. Preferably, to control the reaction, the monomer mixture is fed continuously, more preferably under starve-feed conditions. Preferably, a seed polymerisation is carried out first using a minor amount of the monomer mixture (e.g. up to 10%) and once this is completed, the remainder of the monomer mixture is preferably fed continuously, more preferably under starve-feed conditions. All or some of the ionic surfactant may be present in the solution at the start of the polymerisation. Where some of the ionic surfactant is present to begin with the remainder of the ionic surfactant may be added (e.g. fed continuously) as, the polymerisation progresses. A non-ionic surfactant may be used in addition to the ionic surfactant. The solution may contain all or some of the initiator. Preferably, at least a portion of the initiator is present in the solution to begin with. Where not all of the initiator is present to begin with, the remainder may be added in one or more batches or fed continuously (preferably fed continuously) to the solution as the polymerisation progresses. A solution of the initiator with ionic surfactant in water may be used for this purpose and preferably is fed continuously. Preferably, the initiator is fed continuously.

Suitable ionic surfactants for emulsion polymerisation are those described above.

Suitable initiators for emulsion polymerisation include persulphates such as sodium persulphate, potassium persulphate and ammonium persulphate. Other suitable initiators are known in the art, e.g. peroxide initiators. As the initiator, combinations of initiators may be used or they be used singly.

Chain transfer agents (CTAs) for emulsion polymerisation may be contained in the monomer mixture or added separately to the solution. Suitable CTAs include mercaptans (thiols), such as alkyl mercaptans and thioglycolates, and halocarbons. Examples of alkyl mercaptans include dodecyl mercaptan. Examples of thioglycolates include iso-octyl thioglycolate. Examples of halocarbons include carbon tetrachloride and carbon tetrabromide.

The latex once formed is preferably screened to remove oversized particles prior to use in the toner preparation, e.g. by filtration through a mesh. Suitable meshes for this purpose include 52 µm nylon mesh and 32 before µm nylon mesh.

The term colorant particles herein means any particles which are colored and accordingly includes particles which contain colorant as well as particles of colorant. For example, colorant particles may include, without limitation, pigment particles, pigmented particles such as pigmented resin particles (i.e. resin particles containing pigment therein), or dyed particles such as dyed resin particles (i.e. resin particles containing dye therein). More preferably, the colorant particles are pigment particles or pigmented particles (hereinafter collectively pigmentary particles). Most preferably, the colorant particles comprise pigment particles.

Preferably, the colorant dispersion is a dispersion in water i.e. is an aqueous dispersion. The colorant dispersion may be prepared by processes known in the art, preferably by milling the colorant with a surfactant (preferably an ionic surfactant) in an aqueous medium. Preferably, in one embodiment of the process, the colorant dispersion is prepared by milling the colorant with an ionic surfactant, and optionally a non-ionic surfactant, until the particle size is suitably reduced.

Preferably, the volume average size of the primary colorant particle, as measured by laser diffraction, is less than 500 nm, more preferably less than 300 nm, still more preferably less than 200 nm and most preferably less than 100 nm. It is preferably more than 20 nm. A suitable laser diffraction measuring device is the Coulter™ LS230 Laser Diffraction Particle Size Analyser.

Alternatively, an aqueous dispersion of colorant particles may be produced by a solution dispersion process in the following way. A polymer (e.g. polyester) is dissolved in an organic solvent. Preferably the solvent used should be immiscible with water, dissolve the polymer and/or be removable by distillation relatively easily. Suitable solvents comprise xylene, ethyl acetate and/or methylene chloride. To this solution is added a colorant, either a pigment or a dye. If a dye is used this is simply dissolved in the polymer solution to produce a colored liquid solution. If a pigment is used it may be added, preferably with one or more suitable pigment dispersants (which may be ionic or non-ionic). The colored polymer solution is then dispersed in water with a surfactant and the solvent removed by distillation to leave an aqueous dispersion of pigmentary particles containing the colorant dissolved or dispersed within the polymer.

The colorant dispersion preferably comprises an ionic surfactant to stabilise the colorant particles in dispersion. Optionally, a non-ionic surfactant may also be incorporated into the colorant dispersion. Examples of ionic and non-ionic surfactants for the colorant dispersion are as described above for the latexes.

In preferred embodiments, the colorant dispersion is stabilised with an ionic surfactant, which has the same polarity (more preferably is the same ionic surfactant) as the ionic surfactant used for the latexes and the optional wax dispersion. This ionic surfactant is preferably capable of being converted from an ionic to a non-ionic form (and vice versa) by a change in pH, i.e. is reversibly ionisable. Examples of such surfactants are described above, e.g. a carboxy functional anionic surfactant.

The colorant may be of any color including black. The colorant may comprise a pigment or a dye. Preferably, the colorant comprises a pigment. Any suitable pigment known in the art can be used, including black and magnetic pigments. Chemical classes of pigments include, without limitation for example carbon black, magnetite, copper phthalocyanine, quinacridones, xanthenes, mono- and dis-azo pigments, naphthols, etc. Examples include CI Pigment Blue 15:3, CI Pigment Red 31, 57, 81, 122, 146, 147, 184 or 185; CI Pigment Yellow 12, 13, 17, 74, 83, 93, 150, 151, 155, 180 or 185. In full colour printing it is normal to use yellow, magenta, cyan and black toners. However it is possible to make specific toners for spot colour or custom colour applications.

Preferably, the colorant is a non-magnetic colorant. Preferably, the toner is a non-magnetic toner.

Preferably, the toner further comprises wax. Wax may act as a release agent. Accordingly, preferably, a dispersion of wax particles is further provided in the process for preparing a toner. In the those embodiments, the process preferably comprises mixing the dispersion of wax particles with the latexes and the dispersion of colorant particles and then causing the wax particles, resin particles and the colorant particles to associate to form the aggregate particles.

The wax dispersion is preferably a dispersion in water i.e. is an aqueous dispersion. The wax dispersion is preferably prepared by the mixing together of a wax with the ionic surfactant to stabilise the wax particles in dispersion. Examples of ionic and optionally non-ionic surfactants for the wax dispersion are the same as for the latexes and colorant dispersion described above.

In preferred embodiments, the wax dispersion is stabilised with an ionic surfactant, which has the same polarity (more preferably is the same ionic surfactant) as the ionic surfactant used for the latexes and the colorant dispersion. This ionic surfactant is preferably capable of being converted from an ionic to a non-ionic form (and vice versa) by a change in pH, i.e. is reversibly ionisable. Examples of such surfactants are described above, e.g. a carboxy functional anionic surfactant).

The wax should have a melting point (mpt) (as measured by the peak position by differential scanning calorimetry (dsc)) of from 50-150° C., preferably from 50-130° C., more preferably from 50-110° C., especially from 65-85° C. If the mpt is >150° C. the release properties at lower temperatures are inferior, especially where high print densities are used. If the mpt is <50° C. the storage stability of the toner will suffer, and the toner may be more prone to showing filming of the OPC or metering blade.

The wax may comprise any conventionally used wax. Examples include hydrocarbon waxes (e.g. polyethylenes such as Polywax™ 400, 500, 600, 655, 725, 850, 1000, 2000 and 3000 from Baker Petrolite; paraffin waxes and waxes made from CO and $H_2$, especially Fischer-Tropsch waxes such as Paraflint™ C80 and H1 from Sasol); ester waxes, including natural waxes such as Carnauba and Montan waxes and synthetic waxes; amide waxes; and mixtures of these. Functional waxes (e.g. containing acid groups) may be used. Hydrocarbon waxes are preferred, especially Fischer-Tropsch, paraffin and polyethylene waxes. It is especially preferred to use a mixture of Fischer-Tropsch and Carnauba waxes, or a mixture of paraffin and Carnauba waxes.

The amount of wax present in the toner is preferably from 1-30 wt parts for 100 wt parts of the binder resin. The distribution of the wax through the toner is also an important factor, it being preferred that wax is substantially not present at the surface of the toner.

The volume average particle size of the wax particles, which may be measured by laser diffraction, in the dispersion is preferably in the range from 100 nm to 2 µm, more preferably from 100-800 nm, still more preferably from 150-600 nm, and especially from 150-500 nm. The wax particle size is chosen such that an even and consistent incorporation into the toner is achieved.

The process may be very efficient at incorporating a wax in the toner in order to improve its release properties. The wax may be incorporated in the toner in relatively large amounts compared with some prior art processes and may be incorporated in uniformly sized wax domains, which may improve the transparency of prints formed by the toner. The wax is preferably present in the toner in domains of mean diameter 2 µm or less, preferably 1.5 µm or less. Preferably, the wax domains are of mean diameter 0.2 µm or greater, more preferably 0.5 µm or greater. Preferably the wax is not substantially present at the surface of the toner.

The toner may further optionally comprise a charge control agent (CCA). The amount of CCA present in the toner is preferably from 0.1-10 wt parts for 100 wt parts of the binder resin. For the process, the CCA may be mixed with the dispersion(s) and latexes. For example, the CCA may be milled with the colorant so as to form part of the colorant dispersion or provided separately (e.g. as a wet cake) and mixed with the dispersion(s) and latexes. Suitable CCAs are preferably colourless. Types of suitable CCA for use in toners are known in the art. For example, the CCA may be selected from such known classes of CCAs as: metal azo complexes, phenolic polymers and calixarenes, nigrosine, quaternary ammonium salts, arylsulphones and metal complexes such as metal complexes of hydroxycarboxylic acids (especially of aromatic hydroxycarboxylic acids). Commercial CCA products include Kayacharge N1, N3 and N4 from Nippon Kayaku and TN-105 from Hodogaya. A preferred CCA is a metal complex of a hydroxycarboxylic acid (especially of an aromatic hydroxycarboxylic acid). A preferred metal complex of an aromatic hydroxycarboxylic acids is selected from metal complexes of salicylic acid, bon acid and alkyl or aryl substituted derivatives thereof (specific examples include a metal complex of salicylic acid, a metal complex of di-tert butyl salicylic acid and a metal complex of bon acid). The metal in the metal complex is preferably a transition metal (e.g. titanium, vanadium, chromium, manganese, iron, cobalt, nickel, copper or zinc) or a group IIIB metal (e.g. aluminium or gallium). Preferred metals are selected from aluminium, chromium, manganese, iron, cobalt, nickel, copper or zinc (especially aluminium, zinc and chromium). Commercial CCA products which are metal complexes include Bontron™ E81, E82, E84 and E88 (Orient Chem Co.) and the Boron compound LR 147 (Japan Carlit).

Mixing of the latexes and dispersion(s) may be performed by any conventional method of mixing dispersions. The mixing may include a low shear condition (e.g. using a low shear stirring means) and/or a high shear condition (e.g. using a rotor-stator type mixer).

The particles may be caused to associate to form aggregate particles by any suitable method known in the art.

In one type of embodiment for instance, the association may be caused by heating and stirring the mixed dispersion of particles. Such a process is described, for example, in U.S. Pat. No. 4,996,127.

In preferred embodiments, however, the association is caused by the addition of an association agent.

In embodiments, the association agent may comprise an inorganic salt, in which case the associating method is referred to as "salting-out". Known salting-out processes for associating particles include those described, for example, in U.S. Pat. No. 4,983,488. In salting-out processes for associating the particles, the inorganic salt may comprise an alkali metal salt (e.g. lithium, sodium or potassium chloride and the like), an alkaline earth metal salt (e.g. magnesium or calcium chloride and the like), or a Group IIIB metal salt (e.g. aluminium chloride and the like).

In other embodiments, the association agent may comprise an organic coagulant, such as an ionic surfactant of opposite polarity to the ionic surfactant in the latexes and dispersion(s) which stabilises the dispersed particles. Such processes using "counter-ionic" surfactants are described, for example, in U.S. Pat. No. 5,418,108 and numerous other patents. In a variation of this mechanism, the colorant particles may be stabilised in the colorant dispersion by an ionic surfactant of opposite polarity (charge sign) to the ionic surfactant which stabilises the resin particles in the latexes such that, when the colorant and latexes are mixed, association of the particles may be caused by mutual cancellation of the charge on the ionic surfactants.

In most preferred embodiments, the association agent comprises an acid or base, preferably an acid. Such a process for associating the particles in the aqueous dispersion is referred to hereinafter as a "pH switch" process.

In the most preferred associating process wherein the association is caused by a pH switch, i.e. by effecting a change in the pH of the dispersion, preferably either from a basic pH to an acidic pH or from an acidic pH to a basic pH, the association agent is an acid or base, designed to change the pH. In these embodiments, the association is caused by changing the pH (of the dispersion) to convert the ionic surfactant which stabilises the particles in dispersion from an ionic state to a non-ionic state. In this case, the ionic surfactant is reversibly ionisable or de-ionisable, i.e. it contains a group which can be converted from an ionic to a non-ionic form and vice versa by adjustment of pH. The ionic form helps stabilise the particles in the dispersion, whereas the non-ionic form is less-stabilising for the particles so that the particles can be made to associate.

In a particularly preferred example, the ionic surfactant in the latexes and colorant dispersion (and optional wax dispersion) may contain a carboxylate group and the latexes and colorant dispersion (and optional wax dispersion) may be provided at neutral to high pH (i.e. above neutral) with association then being effected by addition of an acid, which decreases the pH (i.e. below neutral and preferably to a pH below 4) and converts the ionic surfactant from its more dispersion stabilising, ionic carboxylate form to its less-stabilising, non-ionic carboxylic acid form.

Alternatively, in another preferred example, the ionic surfactant may contain a group which is the acid salt of a tertiary amine, and the latexes and colorant dispersion (and optional wax dispersion) may be provided at low pH (i.e. below neutral) with association then being effected by addition of a base which increases the pH (i.e. above neutral and preferably to a pH above 8) and converts the surfactant from its more dispersion stabilising cationic form to its less-stabilising non-ionic form.

The pH switch processes allow a very efficient use of surfactant and have the ability to keep overall surfactant levels very low (e.g. compared to "counter-ionic" association processes referred to above). This is advantageous since residual surfactant in the final toner can be problematic, especially in affecting the charging properties of the toner, particularly at high humidity. In addition, such processes avoid the need for large quantities of salt, as required, for example, in the "salting-out" association processes, which would need to be washed out. In the pH switch form of the process, the individual components of binder resin, colorant and any other optional ingredients, can be particularly well mixed prior to inducing association, which, in turn, may lead to improved homogeneity of distribution of the components in the final toner and consequently improved toner properties.

Stirring to achieve mixing of the particles is preferably performed during the association step.

The association step is preferably carried out below the Tg of the binder resin.

The process of the present invention preferably further comprises a step of heating (and preferably stirring) the aggregate particles, preferably at a temperature below the Tg of the binder resin, to cause the aggregate particles to grow to the desired size. This step is referred to herein as the growth step. The aggregate particles are composite particles comprising the resin particles, colorant particles and optional wax particles. Preferably, the aggregate particles are of particle size from 1-20 μm, more preferably from 2-20 μm, especially from 3-10 μm. Once the desired aggregate particle size is established, the aggregate particles may be stabilised against further growth. This may be achieved, for example, by addition of further surfactant, and/or by a change in pH to convert the ionic surfactant back to its ionic form (e.g. by a change in pH back to high, i.e. above neutral, pH where acid was used to associate the particles). Stabilisation against further growth by a change in pH is especially preferable where a pH switch process was employed for the association. Stabilisation against further growth by a change in pH preferably converts the ionisation state of the ionic surfactant from its less stabilising non-ionic form back to its more dispersion stabilising ionic form. In preferred embodiments, both addition of further (preferably ionic) surfactant and a change in pH are employed.

After the association and optional growth step, the temperature is then raised above the Tg of the binder resin in a step which causes fusion within the aggregate particles to form the toner particles. For example the temperature in this fusion step may lie in the range above 80° C. or more preferably above 100° C., e.g. from 80-140° C. or more preferably from 100-140° C. The fusion step brings about fusion (i.e. internal coalescence) of the aggregate particles. Thus, the toner particles so formed comprise aggregate particles which have been internally fused.

The aggregate particles and/or toner particles typically have a volume average particle size from 2-20 μm, more preferably 3-10 μm, still more preferably 4-10 μm and most preferably 5-9 μm.

During the fusion step of heating above the Tg of the binder resin, the shape of the toner particles may be controlled through selection of the temperature and the heating time.

In certain embodiments, the fusion of the aggregate particles may be effected at the same time as formation of the aggregate particles.

The toner particles are preferably recovered, e.g. by filtration, for subsequent use as an electrophotographic toner. After fusion, the dispersion of toner particles is preferably cooled and then the toner particles recovered. Methods of recovery include filtration, such as filtration by a filter press. The recovered toner may then optionally be washed (e.g. to remove at least some surfactant) and/or optionally be dried using methods known in the art. The washing step, for example, may comprise washing with water, or dilute acid or base. Drying, for example, may comprise drying assisted by heat and/or reduced pressure (vacuum).

The toner particles, especially the recovered and dried toner particles, may be blended with one or more surface additives as known in the art and/or as described in more detail below.

The toner particles, especially the recovered and dried toner particles, may be blended with one or more surface additives to improve the powder flow properties of the toner, or to tune the tribocharge or other properties, as is known in the art. Typical surface additives include, but are not limited to inorganic oxides, carbides, nitrides and titanates. Inorganic oxides include silica and metal oxides such as titania and alumina. Organic additives include polymeric beads (for example acrylic or fluoropolymer beads) and metal stearates (for example zinc stearate). Conducting additive particles may also be used, including those based on tin oxide (e.g. those containing antimony tin oxide or indium tin oxide). Silica, titania and alumina are preferred. Silica is most preferred.

Each surface additive may be used at 0.1-5.0 wt % based on the weight of the unblended toner (i.e. the toner prior to addition of the surface additive), preferably 0.2-3.0 wt %, more preferably 0.25-2.0 wt %. The total level of surface additives used may be from about 0.1 to about 10 wt %, preferably from about 0.5-5%, based on the weight of the unblended toner. Preferably, the surface additives comprise silica in an amount 0.5-5%

The additives may be added by blending with the toner, using, for example, a Henschel blender, a Nara Hybridiser, or a Cyclomix blender (available from Hosokawa).

The particles of the above surface additives, including silica, titania and alumina, preferably may be made hydrophobic, e.g. by reaction with a silane and/or a silicone polymer. Examples of hydrophobising groups include alkyl halosilanes, aryl halosilanes, alkyl alkoxysilanes (e.g. butyl trimethoxysilane, iso-butyl trimethoxysilane and octyl trimethoxysilane), aryl alkoxysilanes, hexamethyldisilazane, dimethylpolysiloxane and octamethylcyclotetrasiloxane. Other hydrophobising groups include those containing amine or ammonium groups. Mixtures of hydrophobising groups can be used (for example mixtures of silicone and silane groups, or alkylsilanes and aminoalkylsilanes.)

Examples of hydrophobic silicas include those commercially available from Nippon Aerosil, Degussa, Wacker-Chemie and Cabot Corporation. Specific examples include those made by reaction with dimethyldichlorosilane (e.g. Aerosil™ 8972, R974 and R976 from Degussa); those made by reaction with dimethylpolysiloxane (e.g. Aerosil™ RY50, NY50, RY200, RY200S and R202 from Degussa); those made by reaction with hexamethyldisilazane (e.g. Aerosil™ RX50, NAX50, RX200, RX300, R812 and R812S from Degussa); those made by reaction with alkylsilanes (e.g. Aerosil™ R805 and R816 from Degussa) and those made by reaction with octamethylcyclotetrasiloxane (e.g. Aerosil™ R104 and R106 from Degussa). Examples of suitable silicas from Wacker include the HDK™ range of silicas for toner, including H05TD, H05TM, H05TX, H05TA, H13TD, H13TM, H13TX, H13TA, H20TD, H20TM, H20TX, H30TD, H30TM, H30TX, H30TA.

The primary particle size of suitable surface additives, especially silicas, is typically from 5-200 nm, preferably from 7-50 nm. The BET surface area of the additives, especially silicas, may be from 10-350 $m^2/g$, preferably 30-300 $m^2/g$. Combinations of additives, especially silicas, with different particle size and/or surface area may be used.

It is possible to blend the different size additives in a single blending step, but it is often preferred to blend them in separate blending steps. In this case, the larger additive may be blended before or after the smaller additive. It may further be preferred to use two stages of blending, where in at least one stage a mixture of additives of different particle size is used. For example, an additive with low particle size may be used in the first stage, with a mixture of additives of different particle size in the second step.

Where titania is used, it is preferred to use a grade which has been hydrophobised, e.g. by reaction with an alkylsilane and/or a silicone polymer. The titania may be crystalline or amorphous. Where crystalline it may consist of rutile or anatase structures, or mixtures of the two. Examples include grades T805 or NKT90 from Nippon Aerosil and STT-30A from Titan Kogyo.

Hydrophilic or hydrophobic grades of alumina may be used. An example is Aluminium Oxide C from Degussa.

It is often preferred to use combinations of silica and titania, or of silica, titania and alumina. Combinations of large and small silicas, as described above, can be used in conjunction with titania, alumina, or with blends of titania and alumina. It is also often preferred to use silica alone. In that case, combinations of large and small silicas, as described above, can be used.

Preferred formulations of surface additives include those in the following list:
  hydrophobised silica;
  large and small particle size silica combinations, which silicas may be optionally hydrophobised;
  hydrophobised silica and one or both of hydrophobised titania and hydrophilic or hydrophobised alumina;
  large and small particle size silica combinations as described above; and
  one or both of hydrophobised titania and hydrophilic or hydrophobised alumina.

Polymer beads or zinc stearate may be used to improve the transfer efficiency or cleaning efficiency of the toners. Charge control agents (CCAs) may be added in the external formulation (i.e. surface additive formulation) to modify the charge level or charging rate of the toners.

The process according to the present invention is especially suitable for producing a toner of small particle size and narrow particle size distribution.

The toner particles typically have a volume average particle size from 2-20 μm, more preferably 3-10 μm, still more preferably 4-10 μm and most preferably 5-9 μm.

Preferably, the toner particles have a volume average particle size in the range from 2-20 μm and the $GSD_n$ value is not greater than 1.40.

The $GSD_n$ value is defined by the following expression:

$$GSD_n = D_{50}/D_{15.9}$$

wherein $D_{50}$ is the particle size below which 50% by number of the toner particles have their size and $S_{15.9}$ is the particle size below which 15.9% by number of the toner particles have their size.

Preferably, the GSD, value is not greater than 1.35 and more preferably not greater than 1.30.

A $GSD_v$ value is defined by the following expression:

$$GSD_v = D_{84.1}/D_{50}$$

wherein $D_{84.1}$ is the particle size below which 84.1% by volume of the toner particles have their size and $D_{50}$ is the particle size below which 50% by volume of the toner particles have their size.

Preferably the $GSD_v$ value is not greater than 1.35, more preferably not greater than 1.30.

The volume average particle size and the particle size distribution ($GSD_n$ and $GSD_v$) refer to sizes as measured using a Coulter™ counter with a 100 μm aperture. For example, a Coulter™ Multisizer III instrument may be used. The Coulter™ counter measurement may be conveniently obtained in the present invention by analysing the dispersion of toner particles produced, e.g. after the fusion step of the process.

A narrow particle size distribution provides, among other things, that the toner may possess a more uniform charge distribution leading to improved image quality and higher resolution and have a lower tendency toward filming.

The toner according to the present invention preferably has a mean circularity, as hereinafter defined, of the toner particles as measured by a Flow Particle Image Analyser of at least 0.90 (e.g. in the range 0.90-0.99), more preferably of at least 0.93, especially in the range 0.93-0.99.

The circularity measured by use of a Flow Particle Image Analyser (Sysmex FPIA) is defined as the ratio:

Lo/L where Lo is the circumference of a circle of equivalent area to the particle, and L is the perimeter of the particle itself.

Further preferably, the shape factor of the toner particles, SF1, as hereinafter defined, is at most 180, more preferably at most 165, e.g. in the range 105-180.

Additionally preferably, the shape factor of the toner particles, SF2, as hereinafter defined, is at most 170, more preferably at most 155, e.g. in the range 105-170.

The shape factors SF1 and SF2 of the toner may be measured by image analysis of images generated by scanning electron microscopy (SEM).

The shape factor, SF1, is defined as:

$$SF1 = (ML)^2/A \times \pi/4 \times 100 \text{, where } ML = \text{maximum length across toner, } A = \text{projected area}$$

The shape factor, SF2, is defined as:

$$SF2 = P^2/A \times 1/4\pi \times 100 \text{, where } P = \text{the perimeter of the toner particle. } A = \text{projected area}$$

An average of approximately 100 particles is taken to define the shape factors (SF1 and SF2) for the toner.

The smoothness of the toner after the coalescence stage may also be assessed by measuring the surface area of the toner, for example by the BET method. It is preferred that the BET surface area of the unblended toner is in the range 0.5-1.5 m²/g.

Toner having the above shape properties has been found to have high transfer efficiency from the photoconductor to a substrate (or to an intermediate transfer belt or roller).

If the toner is designed for a printer or copier which does not employ a mechanical cleaning device, it may be preferred to fuse (coalesce) the toner in the fusion step until a substantially spherical shape is attained, e.g. wherein the mean circularity is at least 0.98. If, however, the toner is designed for use in a printer or copier in which a mechanical cleaning device is employed to remove residual toner from the photoconductor after image transfer, it may be preferred to select a smooth but off-spherical shape, where the mean circularity is in the range 0.90-0.99, preferably 0.93-0.98, more preferably 0.94-0.98.

The toner may be used as a mono-component or a dual component developer. In the latter case the toner is mixed with a suitable carrier bead. More preferably the toner is a non-magnetic toner for use as mono-component developer.

Advantageously, toner according to the present invention may be useful in systems with higher printing speeds which require higher fusion speeds. Toner according to the present invention may exhibit good fixation at higher fusion (printing) speeds. Furthermore, preferably, the toner according to the invention does not lead to background development of the photoconductor (OPC) and preferably does not lead to filming of a metering blade or development roller or of the photoconductor. The toner may also exhibit one or more of the following: good storage stability, print transparency, toner charging characteristics and reduced background development of the photoconductor.

The toner of the invention may be suitable, for example, for use in an electroreprographic apparatus having one or more of the following hardware features:

i) a developer roller and metering blade (i.e. where the toner is a mono-component developer);
ii) a cleaning device for mechanically removing waste toner from the photoconductor;
iii) a contact charging means;
iv) means for contact development:
v) heated fusion rollers;
vi) at least four colour printing or copying.

Throughout the description and claims of this specification, the words "comprise", "contain", "include", "have" and the like and variations of the words, for example "comprising" and "comprises", "containing" and "contains", "including" and "includes", "having" and "has" mean "including but not limited to", and are not intended to (and do not) exclude other components and/or steps.

The use of any and all examples, or exemplary language (e.g., "for instance", "such as", "for example") provided herein, is intended merely to better illustrate the invention and does not indicate a limitation on the scope of the invention unless otherwise claimed. No language in the specification should be construed as indicating any non-claimed element as essential to the practice of the invention.

Unless the context clearly indicates otherwise, plural forms of the terms herein are to be construed as including the singular form and vice versa. For example, the terms "a" and "an" are to be construed as referring to "at least one".

Any steps in a process described herein may be performed in any order, unless stated otherwise or unless the context clearly requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

Any discussion of documents, acts, materials, devices, articles and the like included herein is solely for the purpose of providing a context for the present invention. It is not suggested or represented that any or all of these matters formed part of the prior art or were common general knowledge in the field relevant to the present invention as it existed before the priority date or filing date of this patent application.

The invention will now be illustrated by the following Examples, which are non-limiting on the scope of the invention. All percentages or parts referred to are percentages or parts by weight unless otherwise stated. Solids contents of latexes and dispersions include surfactant unless otherwise stated.

EXAMPLES

Preparation of Low Molecular Weight (LMW) Latexes

Example 1.1

LMW Latex with Tg not Greater than 52° C. (Latex a-1)

A low molecular weight (LMW) latex was synthesised by emulsion polymerisation. The monomers used were styrene (74.9 wt %), 2-hydroxyethyl methacrylate (2.5 wt %) and (meth)acrylic ester monomers (22.6 wt %) (18.4% butyl acrylate and 4.2% methyl methacrylate). Ammonium persulphate (0.5 wt % based on weight of monomers) was used as the initiator, and a mixture of thiol chain transfer agents (2.5 wt % based on weight of monomers) was used as chain transfer agents. The surfactant (3 wt % based on weight of monomers, i.e. 3 wt pts surfactant for 100 wt pts monomers) was Akypo™ RLM100 (available from Kao), a carboxylated alkyl ethoxylate, i.e. a carboxy-functional anionic surfactant. The latex produced had a resin particle size of 119 nm as measured by a Coulter™ LS230 Laser Diffraction Particle Size Analyser. A sample of the latex was dried down for Differential Scanning calorimetry (DSC) and Gel Permeation Chromatography (GPC) analysis. The glass transition temperature (Tg) as measured by DSC was 50° C. GPC analysis against polystyrene standards showed the resin of the latex to have Mn=5,100, Mw=20,900, Mw/Mn=4.10. The solids content of the latex was 29.4 wt %.

Example 1.2

LMW Latex with Tg Greater than 52° C. (Latex a-2)

A low molecular weight (LMW) latex was synthesised by emulsion polymerisation in a similar manner to Example 1.1 above using a higher proportion of styrene in the monomer mixture and less (meth)acrylic ester monomers. The latex produced had a resin particle size of 119 nm as measured by a Coulter™ LS230 Laser Diffraction Particle Size Analyser. A sample of the latex was dried down for DSC and GPC analysis. The glass transition temperature (Tg) as measured by DSC was 57° C. GPC analysis against polystyrene standards showed the resin of the latex to have Mn=5,800, Mw=21,200, Mw/Mn=3.66. The solids content of the latex was 30.0 wt %.

Preparation of Medium Molecular Weight (MMW) Latexes

Example 1.3

MMW Latex (Latex a-3)

A MMW latex having a bimodal molecular weight distribution was prepared. The latex was made by a two-stage emulsion polymerisation process, in which the higher molecular weight portion was made in the absence of chain transfer agent, and in which the molecular weight of the lower molecular weight portion was reduced by use of 2.5 wt % of mixed thiol chain transfer agents. Ammonium persulphate (0.5 wt % based on monomers) was used as the initiator and the surfactant was Akypo™ RLM100 (Kao Corp., 3 wt % based on monomers).

The monomer composition for the low molecular weight portion was styrene (82.5 wt %), 2-hydroxyethyl methacrylate (2.5 wt %) and (meth)acrylic ester monomers (15.0 wt %). The overall monomer composition was styrene (73.85 wt %), 2-hydroxyethyl methacrylate (6.25 wt %) and (meth)acrylic ester monomers (19.9 wt %).

A sample of the latex was dried down for DSC and GPC analysis. The glass transition temperature (Tg) as measured by DSC was 66° C. GPC analysis against polystyrene standards showed the resin of the latex to have Mn=8,400, Mw=230,000, Mw/Mn=27.4. The solids content of the latex was 40.0 wt %.

Example 1.4

MMW Latex (Latex a-4)

A MMW latex having a monomodal molecular weight distribution was synthesised by emulsion polymerisation in a similar manner to Example 1.1 above. The monomers used were styrene (71.0 wt %), 2-hydroxyethyl methacrylate (4.0 wt %) and (meth)acrylic ester monomers (20.8 wt % butyl acrylate and 4.2 wt % methyl methacrylate). Ammonium persulphate (0.5 wt % on monomers) was used as the initiator, and a mixture of thiol chain transfer agents (0.6 wt %) was used as chain transfer agents. The surfactant was Akypo™ RLM100 (Kao, 3 wt % on monomers). The latex produced had a resin particle size of 119 nm as measured by a Coulter™ LS230 Laser Diffraction Particle Size Analyser. A sample of the latex was dried down for Differential Scanning calorimetry (DSC) and Gel Permeation Chromatography (GPC) analysis. The glass transition temperature (Tg) as measured by DSC was 59° C. GPC analysis against polystyrene standards showed the resin of the latex to have Mn=14,100, Mw=80,500, Mw/Mn=5.71. The solids content of the latex was 39.8 wt %.

The properties of the latexes are summarised in Table 1 below.

TABLE 1

Properties of Latexes

| Latex Ex. No. | Molecular weight | Molecular weight distribution | Tg/ °C. | GPC Mn/K* | GPC Mw/K* |
|---|---|---|---|---|---|
| 1.1 (Latex a-1) | Low | monomodal | 50 | 5.1 | 20.2 |
| 1.2 (Latex a-2) | Low | monomodal | 57 | 5.8 | 21.2 |
| 1.3 (Latex a-3) | Medium | bimodal | 66 | 8.4 | 230.0 |
| 1.4 (Latex a-4) | Medium | monomodal | 59 | 14.4 | 70.7 |

*K means 1,000

Preparation of Colorant Dispersion

Example 2

Pigment/Charge Control Agent Co-Dispersion (Dispersion b-1)

A co-dispersion of C.I. Pigment Red 184 and charge control agent BONTRON E88™ (ex Orient Chemical Co.) was used. The pigment and CCA were co-milled in water using a bead mill, with Akypo™ RLM100 (Kao) and Solsperse™ 27,000 as dispersants. Solsperse 27,000 is a non-ionic surfactant available from Lubrizol. The pigment solids content of the co-dispersion was 19.2% and the CCA solids content was 5.5 wt %.

Preparation of Wax Dispersion

Example 3

Wax Dispersion (Dispersion c-1)

A wax mixture comprising 80 parts by weight Paraflint™ C80 (a Fischer-Tropsch wax) and 20 parts carnauba wax was melt dispersed in water, with Akypo™ RLM100 (Kao). The total solids content was 25.4 wt %.

Preparation of Charge Control Agent (CCA) Wet-Cake

Example 4

Wet-Cake CCA (Dispersion d-1)

A wet-cake of CCA comprising BONTRON E88™ in water (ex Orient Chemical Co.) was used. The total solids of the wet-cake was 21.4 wt %.

Preparation of Toner

Example 5.1

Toner (Comparative)

A toner was made using a low molecular weight (LMW) latex with Tg greater than 52° C.

Mixing:
LMW Latex (a-2) (1072.6 g), MMW Latex (a-3) (123.8 g), the pigment/CCA co-dispersion (b-1) (115.0 g, containing 22.1 g of C.I. Pigment Red 184 and 6.3 g of BONTRON E88™), wax dispersion (c-1) (158 g), wet-cake CCA (d-1) (11.8 g) and water (1651 g) were mixed and stirred in a vessel.

Association and Toner Particle Growth:
The temperature of the mixture was raised to 37° C. Over the course of 270 seconds the mixed dispersions were circulated through a high shear mixer and back into the vessel during which 4% sulphuric acid (270 g) was added into the high shear mixer to cause association of particles. The pH had reduced to 2.05 after acid addition. The mixture was heated for the next 166 minutes (experiencing a maximum temperature of 58° C.) to grow the toner particles. The mixture was then cooled to 50° C. A solution of sodium hydroxide 0.5 M (333 g) was added over 14 minutes to raise the pH to 7.

Coalescence of Toner Particles:
The temperature of the mixture was then raised to 120° C. in a pressurised vessel and held at this temperature for a total of 40 minutes with stirring before being cooled to room temperature. Coulter Counter™ analysis of toner particles above 2 µm in size showed the mean volume particle size was 6.4 µm, the GSDv was 1.24 and the GSDn was 1.32. Observation using an optical microscope showed the toner particles to be of irregular shape. The toner was designated Toner 1.

Example 5.2

Toner (Inventive)

A toner was made using a low molecular weight (LMW) latex with Tg not greater than 52° C.

Mixing:
LMW Latex (a-1) (735 g), MMW Latex (a-3) (83.2 g), the pigment/CCA co-dispersion (b-1) (77.2 g, containing 14.9 g of CI Pigment Red 184 and 4.2 g of BONTRON E88™), wax dispersion (c-1) (105.5 g), wet-cake CCA (d-1) (8.0 g) and water (1481.5 g) were mixed and stirred in a vessel.

Association and Toner Particle Growth:
The temperature of the mixture was raised to 37° C. Over the course of 275 seconds the mixed dispersions were circulated through a high shear mixer and back into the vessel during which 4% sulphuric acid (210 g) was added into the high shear mixer to cause association of particles. The pH had reduced to 2.0 after acid addition. The mixture was heated for the next 116 minutes (experiencing a maximum temperature of 50.9° C.) to grow the toner particles. A solution of sodium hydroxide 0.5 M (280 g) was added over 15 minutes to raise the pH to 7.

Coalescence of Toner Particles:
The temperature of the mixture was then raised to 114° C. in a pressurised vessel and held at this temperature for a total of 40 minutes with stirring before being cooled to room temperature. Coulter Counter™ analysis of toner particles above 2 µm showed the mean volume particle size was 7.3 µm, the GSDv was 1.28 and the GSDn was 1.37. Observation using an optical microscope showed the toner particles to be of irregular shape. The toner was designated Toner 2.

Example 5.3

Toner (Inventive)

A toner was made using a low molecular weight (LMW) latex with Tg not greater than 52° C. and a MMW latex with Mw in the range 50,000 to about 200,000.

Mixing:
LMW Latex (a-1) (869 g), MMW Latex (a-4) (275.5 g), the pigment/CCA co-dispersion (b-1) (111.4 g, containing 21.4 g of CI Pigment Red 184 and 6.1 g of BONTRON E88™), wax dispersion (c-1) (155.9 g), wet-cake CCA (d-1) (11.7 g) and water (1678 g) were mixed and stirred in a vessel.

Association and Toner Particle Growth:
The temperature of the mixture was raised to 37° C. Over the course of 290 seconds the mixed dispersions were circulated through a high shear mixer and back into the vessel during which 4% sulphuric acid (300 g) was added into the high shear mixer to cause association of particles. The pH had reduced to 1.7 after add addition. The mixture was heated for the next 174 minutes (experiencing a maximum temperature of 51° C.) to grow the toner particles. The mixture was then cooled to 45° C. then a solution of sodium hydroxide 0.5 M (380 g) was added over 15 minutes to raise the pH to 7.

Coalescence of Toner Particles:

The temperature of the mixture was then raised to 115° C. in a pressurised vessel and held at this temperature for a total of 10 minutes with stirring before being cooled to room temperature. Coulter Counter™ analysis of toner particles above 2 μm showed the mean volume particle size was 7.2 μm, the GSDv was 1.29 and the GSDn was 1.33. Observation using an optical microscope showed the toner particles to be of irregular shape. The toner was designated Toner 3.

Example 6

Toner Formulation

Toners 1-3 as provided in Examples 5.1 to 5.3 were formulated by mixing each toner with 0.5 wt % of R812S (a small particle size hydrophobic silica obtained from Degussa). The mixing step was performed using a Prism™ mixer. This prepared Formulated Toners 1-3.

Example 7

Toner Evaluation

Evaluation of Fixation Properties—Printing and Crease Testing

Each of the Formulated Toners 1-3 as provided by Example 6 was evaluated for their fuser release and fixation properties. Unfused toner solid area images, with print density 1.0 mg/cm$^2$, were created using a modified mono-component printer to allow control of the mass/area of toner developed. These unfused images were then fused using an off-line fuser adapted to allow control of roller temperature and speed. Paper with a weight of 90 g/m$^2$ was used and the fuser speed was set to a high print speed of 30 pages per minute (ppm). The temperature of the fuser rollers was adjusted from 140-190° C. in 5° C. intervals. The fused images were assessed for fixation by forming a crease in the image, then analysing the creased area using a QEA image Analyser (crease testing). The degree of fixation was calculated from the Fuse Ratio, the Fuse Ratio being the ratio of the optical density in the creased area to a non-creased area of the image. The Fuse Ratio would be 1.0 for perfect fixation and decreases below 1.0 as the degree of fixation decreases. The results are shown in Table 2 below. The Fuse Ratios from the crease tests show clearly that the toners of the present invention (Toners 2 and 3) show improved fixation at a high print speed for a given temperature. The toners of the present invention also showed release from the fuser rollers over a wider range of temperatures (improved temperature/fusion window).

TABLE 2

| Fuse Ratios | | | |
|---|---|---|---|
| Fuse temperature/° C. | Toner 1 (Comparative) | Toner 2 (Inventive) | Toner 3 (Inventive) |
| 150 | — | — | 0.74 |
| 155 | — | — | 0.85 |
| 160 | — | 0.83 | 0.92 |
| 165 | — | 0.89 | 0.91 |
| 170 | 0.78 | 0.91 | 0.91 |
| 175 | 0.86 | 0.91 | 0.94 |
| 180 | 0.93 | 0.98 | 0.95 |
| 185 | 0.93 | 0.96 | 0.96 |

— = lack of release from fuser rollers (cold offset)

The invention claimed is:

1. A toner comprising toner particles which comprise a binder resin and a colorant,
   wherein the binder resin is made from latexes which comprise a low molecular weight (LMW) latex of resin particles having a weight average molecular weight (Mw) less than 50,000 and a medium molecular weight (MMW) latex of resin particles having a Mw from 50,000 to 500,000,
   wherein the glass transition temperature (Tg) of the resin particles of the LMW latex is not greater than 52° C.

2. A toner as claimed in claim 1 wherein the Tg of the resin particles of the MMW latex is at least 5° C. higher than the Tg of the resin particles of the LMW latex.

3. A toner as claimed in claim 1 wherein the Tg of the resin particles of the LMW latex is at least 45° C.

4. A toner as claimed in claim 1 wherein the Tg of the resin particles of the MMW latex is in the range 55-68° C.

5. A toner as claimed in claim 1 wherein the resin particles of the LMW latex have a Mw of 15,000 to 30,000.

6. A toner as claimed in claim 1 wherein the resin particles of the MMW latex have a Mw of 50,000 to 100,000.

7. A toner as claimed in claim 1 wherein the latexes also comprise a high molecular weight (HMW) latex of resin particles having a Mw greater than 500,000.

8. A toner as claimed in claim 1 wherein the binder resin is made from 45-95 wt parts of the LMW latex, 5-55 wt parts of the MMW latex and 0-15 wt parts of the high molecular weight (HMW) latex based on the solids content of the latexes, wherein the total number of parts is 100.

9. A toner as claimed in claim 1 wherein the LMW latex comprises two or more LMW latexes and/or the MMW latex comprises two or more MMW latexes.

10. A toner as claimed in claim 1 wherein the LMW latex has been made by the polymerisation of a monomer mixture comprising 45-80 wt parts of at least one styrenic monomer, 18-50 wt parts of at least one alkyl (meth)acrylate and 1-5 wt parts of at least one polar functional vinyl monomer, wherein the total number of parts is 100.

11. A toner as claimed in claim 10 wherein the LMW latex has been made by the polymerisation of a monomer mixture comprising 45-80 wt parts of at least one styrenic monomer, 15-45 wt parts of at least one low Tg alkyl (meth)acrylate, 1-7 wt parts of at least one high Tg alkyl (meth)acrylate and 1-5 wt parts of at least one polar functional vinyl monomer, wherein the total number of parts is 100.

12. A toner as claimed in claim 1 wherein the MMW latex has been made by the polymerisation of a monomer mixture comprising 45-88 wt parts of at least one styrenic monomer, 10-50 wt parts of at least one alkyl (meth)acrylate and 1-10 wt parts of at least one polar functional vinyl monomer, wherein the total number of parts is 100.

13. A process for preparing a toner as claimed in claim 1, the process comprising at least the steps of:
   (i) providing latexes comprising a low molecular weight (LMW) latex of resin particles having a weight average molecular weight (Mw) less than 50,000 and a medium molecular weight (MMW) latex of resin particles having a Mw from 50,000 to 500,000, wherein the glass transition temperature (Tg) of the resin particles of the LMW latex is not greater than 52° C.;

(ii) providing a dispersion of colorant particles;

(iii) mixing the latexes with the dispersion of colorant particles;

(iv) causing the resin particles and the colorant particles to associate to form aggregate particles; and (v) heating the aggregate particles above the Tg of the binder resin to form toner particles.

14. An image forming method comprising the steps of:

forming an electrostatic image on a photoconductive member;

developing the electrostatic image with a toner to form a toner image;

transferring the toner image onto a substrate; and fixing the toner image onto the substrate;

wherein the toner is a toner as claimed in claim 1.

15. A toner cartridge having at least one chamber for containing a toner, wherein the chamber contains a toner, which is a toner as claimed in claim 1.

\* \* \* \* \*